(12) United States Patent
Olson et al.

(10) Patent No.: US 12,462,264 B2
(45) Date of Patent: Nov. 4, 2025

(54) SYSTEMS AND METHODS FOR APPLYING AN IDENTIFICATION PATTERN TO AN ELECTRONIC DEVICE

(71) Applicant: Schweitzer Engineering Laboratories, Inc., Pullman, WA (US)

(72) Inventors: Alex A. Olson, Pullman, WA (US); Harold R. Klein, Pullman, WA (US); Cody W. Tews, Portland, OR (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 281 days.

(21) Appl. No.: 18/319,218

(22) Filed: May 17, 2023

(65) Prior Publication Data

US 2024/0386446 A1    Nov. 21, 2024

(51) Int. Cl.
*G06Q 30/018* (2023.01)
*G06F 16/583* (2019.01)

(52) U.S. Cl.
CPC ..... *G06Q 30/0185* (2013.01); *G06F 16/5854* (2019.01)

(58) Field of Classification Search
CPC .............. G06Q 30/018; G06Q 30/0185; G06F 16/5854
USPC ........................................................ 705/318
See application file for complete search history.

(56) References Cited

U.S. PATENT DOCUMENTS

| 9,798,910 | B2 | 10/2017 | Gerst |
| 10,724,947 | B2 | 7/2020 | Gerst |
| 11,132,554 | B2 | 9/2021 | Johnson |
| 11,138,427 | B2 | 10/2021 | Florent |
| 2001/0046294 | A1* | 11/2001 | Bandy ...................... G09F 3/00 380/51 |
| 2020/0311365 | A1* | 10/2020 | Cottrill ............ G06K 19/06084 |
| 2020/0412555 | A1* | 12/2020 | Chandra ............... H04L 9/3278 |
| 2021/0174378 | A1* | 6/2021 | Rahimizad ......... G06Q 20/3672 |
| 2022/0188462 | A1* | 6/2022 | Moore ................. H04L 9/3263 |

FOREIGN PATENT DOCUMENTS

WO    2006042913    4/2006

OTHER PUBLICATIONS

Bryon Moyer, "Uniquely Identifying PCBs, Subassemblies, and Packaging", Semiconductor Engineering, Nov. 18, 2020, retrieved from https://semiengineering.com/uniquely-identifying-pcbs-subassemblies-and-packaging/ (Year: 2000).*

Wikipedia, "Physical Unclonable Function," retrieved May 18, 2023 from https://en.wikipedia.org/wiki/Physical_unclonable_function.

* cited by examiner

*Primary Examiner* — Jessica Lemieux
*Assistant Examiner* — Joshua D Schneider
(74) *Attorney, Agent, or Firm* — Fletcher Yoder, P.C.

(57) ABSTRACT

A method of manufacture includes applying an identification pattern over a printed circuit board (PCB), capturing an image of the identification pattern applied to the PCB, associating the image with an additional identification pattern associated with the PCB, and storing the image and the association between the image and the additional identification pattern in a database.

19 Claims, 6 Drawing Sheets

SYSTEMS AND METHODS FOR APPLYING AN IDENTIFICATION PATTERN TO AN ELECTRONIC DEVICE

BACKGROUND

This disclosure relates to an electronic device. More particularly, this disclosure relates to an assembly and application of an identification pattern to a printed circuit board (PCB) in the electronic device for authentication.

Electronic devices are used in a variety of different applications. For example, an electronic device may include a PCB that electrically connects circuitry including various electronic components, such as a resistor, a transistor, a capacitor, an inductor, a diode, a sensor, and so forth, with one another. The PCB and its electronic components may control, adjust, and/or direct flow of electricity to enable the operation of the electronic device. For instance, the PCB may be implemented in an electronic device of an electric power distribution system to control electric power flow from a transmission system to residential communities, factories, industrial areas, and other electricity consumers.

Unfortunately, electronic devices that utilize a PCB assembly may be subject to counterfeiting or tampering. For example, an unauthorized copy of an electronic device may be created or an authentic electronic device could be tampered with after manufacturing but before reaching its destination. Counterfeit or tampered-with electrical devices may have undesirable (e.g., inferior) specifications, function, quality, and/or integrity. Therefore, a counterfeit or tampered-with electrical device may negatively affect operation of a system in which the counterfeit electrical device is implemented.

DETAILED DESCRIPTION

Figure 1:
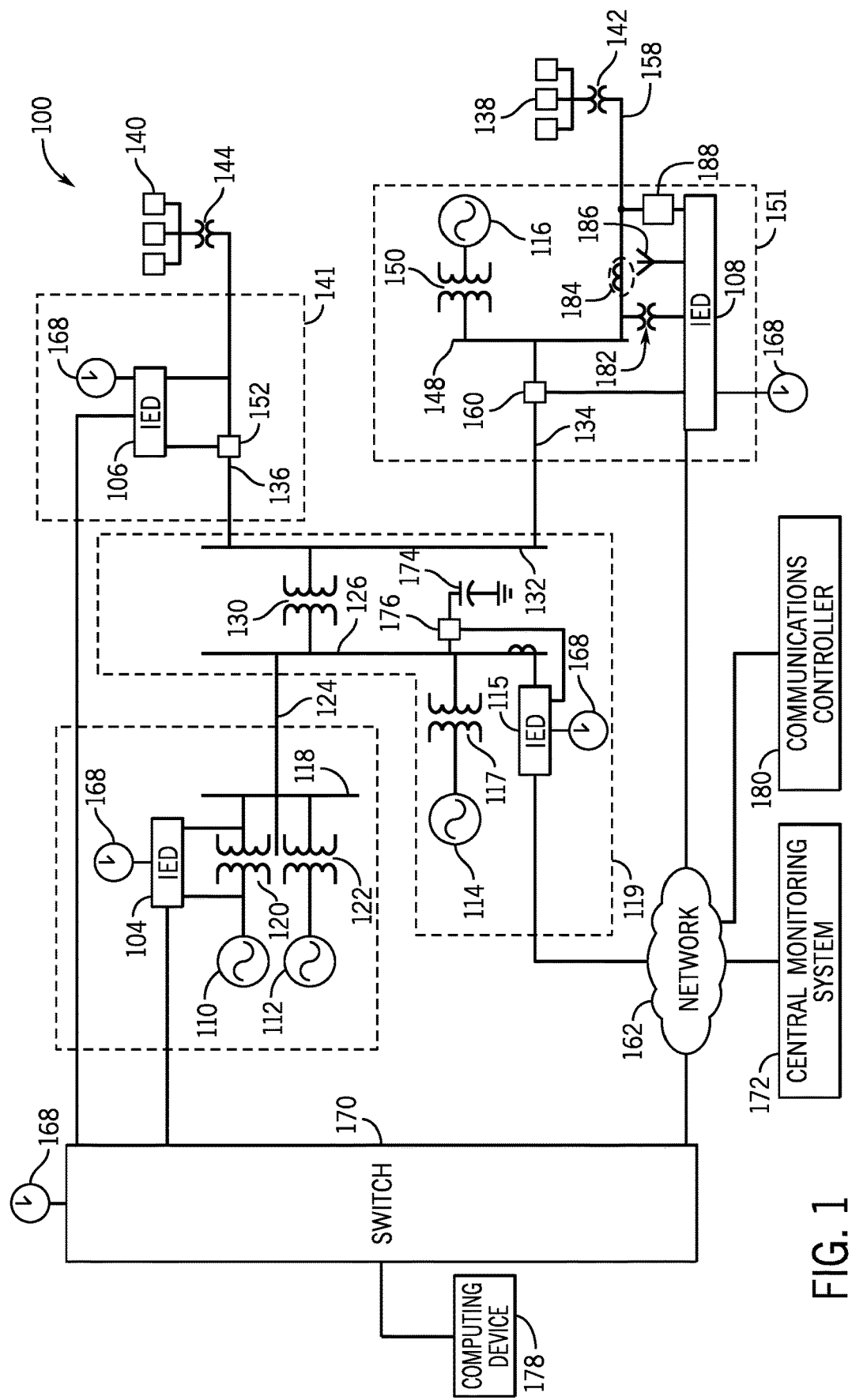
FIG. 1 is a schematic diagram of an electric power delivery system, in accordance with an aspect of the present disclosure.

Embodiments of the present disclosure are directed to the assembly and application of an identification pattern to a printed circuit board (PCB) assembly or other surfaces of a product or product packaging for authentication. A PCB assembly may be used in various electrical systems. For instance, the PCB assembly may be used in an electric power delivery system and may control an aspect of the electric power delivery system. As an example, the PCB assembly may be implemented in a relay that enables or blocks electrical power flow between other devices of the electric power distribution system. The PCB assembly may include a variety of electronic components that are physically coupled to a PCB. The electronic components may be electrically coupled to one another via conductors that are physically coupled to the PCB. Thus, the PCB may enable the flow of electricity to the electronic components to enable operation of the electronic components.

As described above, certain electronic devices that utilize a PCB assembly may be subject to counterfeiting or tampering. A counterfeit electrical device may negatively affect operation of a system in which the counterfeit electrical device is implemented. Additionally, an electronic device may be tampered with, and it may be difficult to identify electrical components that have been tampered with. In some cases, it may be difficult to distinguish between a counterfeit electronic device and an authorized copy of an electronic device (e.g., created by the original manufacturer). For example, an authentic electronic device may have an associated serial number that may be relatively easily copied for usage in association with a counterfeit electronic device. Therefore, it may be desirable to enable more efficient detection of counterfeited electronic devices.

Accordingly, an electronic device may be authenticated using a robust identification pattern that cannot be easily copied. The embodiments discussed herein are directed to an identification pattern used to distinguish an electronic device from a counterfeit product or identify whether an authentic electronic device has been tampered with. For example, the identification pattern may be applied to a PCB assembly of the electronic device. The identification pattern may be a random or pseudo-random pattern (e.g., unique and non-repeating) to prevent duplication of the identification pattern. That is, a counterfeiter or tampering agent may not easily reproduce and apply a copy of the identification pattern to a counterfeit product or tamper with the electronic device. Thus, the authorized PCB assembly having the identification pattern may be distinguishable from a counterfeit product or may reveal if the PCB assembly has been tampered with.

In some embodiments, the identification pattern may include a coating of material, a spray coating, a film, or the like. Additionally or alternatively, the identification pattern may include visible and/or non-visible (e.g., ultraviolet) pigment. An image of the identification pattern applied to the PCB assembly may be captured and associated with an additional identification pattern (e.g., a serial number, a barcode, a quick response (QR) code) for verification of the PCB assembly. Further, the image and the association may be stored in a database as a stored image for retrieval. For example, the PCB assembly may be sent to a customer, who may capture an image of the PCB assembly with the identification pattern, along with the associated additional identification pattern, and send the image to the manufacturer for authentication.

The manufacturer may receive a captured image and the associated additional identification pattern from the customer and retrieve the stored image to compare the received image and additional identification pattern with the stored image and additional identification pattern to determine whether the PCB assembly of the customer is an authorized product or a counterfeit or potentially interdicted product. For example, a match (e.g., within a threshold percentage of comparability) between the received image/additional identification pattern and the stored image/additional identification pattern may indicate an authorized product, whereas a mismatch between the received image/additional identification pattern and the stored image/additional identification pattern may indicate a counterfeit or potentially interdicted product. Thus, the identification pattern (e.g., a captured image of the identification pattern) may enable authentication of the PCB assembly. Authentication of the PCB assembly may enable the customer to implement the PCB assembly more suitably, such as in a particular electrical assembly.

With the preceding in mind, FIG. 1 is a schematic diagram of an electric power delivery system or an electric power delivery system 100 that may include authenticated electronic devices that may be used to generate, transmit, and/or distribute electric energy to various loads (e.g., different structures). The electric power delivery system 100 may use various IEDs 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the switch 170 and/or to send data, such as a user input, to the electric power delivery system 100 via the switch 170. Thus, the switch 170 may enable or block operation of the electric power delivery system 100 via the computing device 178.

A communications controller 180 may interface with equipment in the communications network 162 to create a software-defined network that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

Any of the devices described in FIG. 1 may include a PCB assembly that has an identification pattern. For example, the IEDs 104, 106, 108, and 115 may each include the PCB with the identification pattern. Additionally or alternatively, the communications controller 180, the central monitoring system 172, and the switch 170 may each include the PCB with the identification pattern. The identification pattern may enable a device to be distinguished from a counterfeit product to facilitate authentication of the device.

Figure 2:
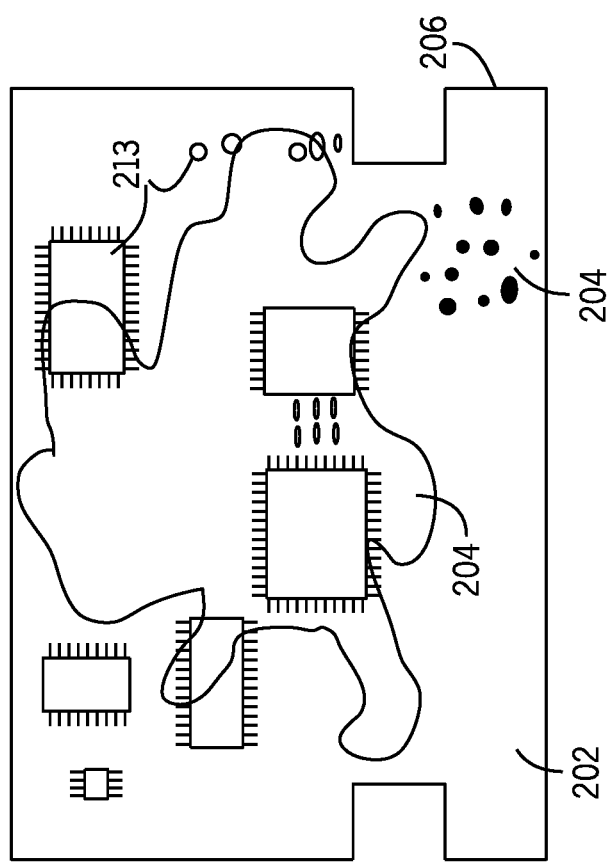
FIG. 2 is a perspective view of a system that associates a PCB with an identification pattern.

FIG. 2 is a perspective view of a system 200 (e.g., a manufacturing site, a customer site, an electrical device kit) that associates a PCB 202 with an identification pattern 204. The PCB 202 may be a single-sided board (e.g., one layer) or a multi-sided board (e.g., multiple layers) and may have one or more electrical components 213 and/or one or more non-electrical components coupled thereto to form a PCB assembly 206. The electrical components 213 may include components such as a resistor, a capacitor, a transformer, a transistor, a diode, a battery, an integrated circuit (IC), an oscillator, an inductor, a switch, a sensor, a conductor (e.g., a wire, a cable, a busbar), and the like. During operation of the PCB 202, the electrical components 213 may receive a flow of electricity and operate via the flow of electricity. For example, the electrical components may adjust (e.g., change a voltage or current flow) the flow of electricity, direct (e.g., enable, block, split) the flow of electricity, transmit a signal based on the flow of electricity, and so forth. Operation of the electrical components 213 may enable the PCB assembly 206 to perform a desired function. For example, the PCB assembly 206 may be implemented in an electronic device, such as a mobile device (e.g., a phone, a tablet, a laptop computer), a controller, or a processor. Operation of the electrical components 213 and of the PCB assembly 206 may enable the electronic device to operate, such as to provide an output signal (e.g., based on a received input signal).

To enable improved authentication of the PCB assembly 206, the identification pattern 204 may be applied over the PCB 202 (e.g., a portion of the PCB 202, an entirety of the PCB 202), as well as over at least some of the electrical components coupled to the PCB 202. The identification pattern 204 may be a random or pseudo-random (e.g., unique, non-repeating) pattern applied to the PCB assembly 206 to reduce the likelihood and capability of duplication. Thus, the identification pattern 204 may be uniquely applied to the PCB assembly 206. For example, an appearance of the identification pattern 204, a position of the identification pattern 204 (e.g., on the PCB 202, relative to the electrical components 213), and/or a material of the identification pattern 204 may be specific for the PCB assembly 206. In other words, each different PCB assembly 206 may have a different identification pattern 204 (e.g., an identification pattern 204 having a different appearance) such that different PCB assemblies 206 may be distinguished from one another via their respective identification patterns 204.

In some embodiments, the identification pattern 204 may be physically generated and applied via spraying, splattering, misting, brushing, or the like (e.g., flicking speckles of invisible-to-the-human-eye material, such as ultraviolet ink). In additional or alternative embodiments, the identification pattern 204 may be digitally generated (e.g., by the computing system 212) and applied. In either case, the identification pattern 204 may be applied to the PCB assembly 206 as a cover, such as a coating of material (e.g., a conformal coating), a sprayed material, a film of material, and the like. Indeed, the identification pattern 204 may include a dollop, a splatter, or the like having a random shape and/or a random distribution on the PCB assembly 206. The identification pattern 204 may additionally or alternatively be applied as via a different technique, such as via etching, a laser technique, a chemical reaction, and so forth. It should be noted that the identification pattern 204 may be visible, semi-visible (e.g., visible at specific conditions, such as from a particular angle), or non-visible (e.g., using ultraviolet ink). The manner in which the identification pattern 204 is applied to the PCB assembly 206 enables the identification pattern 204 to have a unique appearance that is identifiable but difficult to duplicate. For example, it may be difficult to manipulate a different PCB assembly to have an identification pattern 204 with the same shape, covering the same electrical components 213, and/or having the same applied technique as the illustrated identification pattern 204 applied to the PCB assembly 206. Thus, the particular identification pattern 204 may be specifically associated with the PCB assembly 206 and not with any other PCB assembly (e.g., a counterfeit or unauthorized PCB assembly or one that has been tampered with, such as having had components replaced or removed).

Although the identification pattern 204 is applied to a PCB assembly 206 having a single PCB 202 in the illustrated embodiment, the identification pattern 204 may be applied to a PCB assembly 206 having multiple PCBs 202 in additional or alternative embodiments. For example, the PCBs 202 may be coupled to one another, and the identification pattern 204 may be applied to more than one of the PCBs 202. It should further be noted that the identification pattern 204 may be applied to electrical components that are not coupled to the PCB 202, such as an electrical component (e.g., of another PCB assembly) to which the PCB 202 is positioned adjacent.

Figure 3:
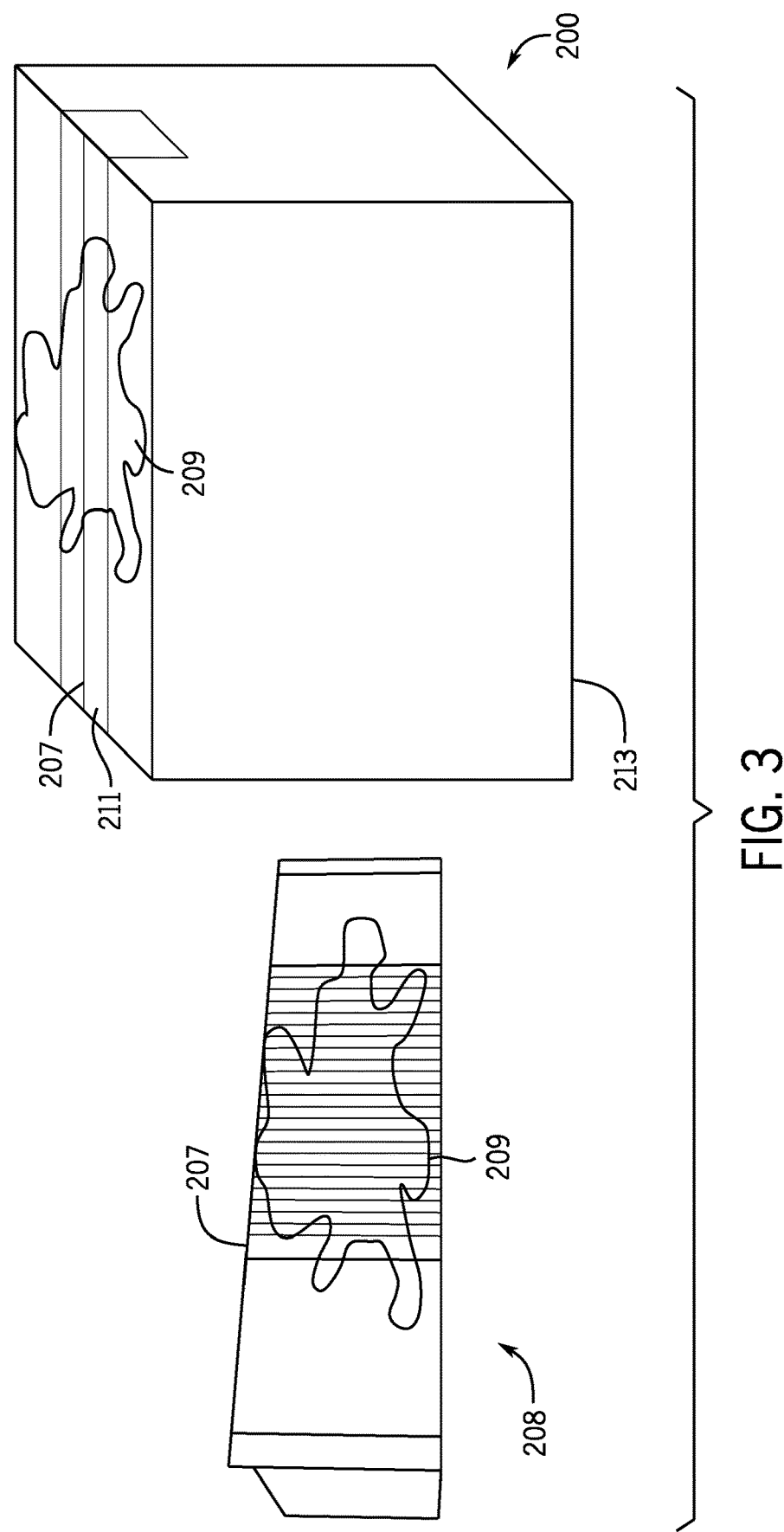
FIG. 3 is a perspective view of an enclosure with an identification pattern.

In some embodiments, the PCB assembly 206 may be disposed within the enclosure 208. FIG. 3 is a perspective view of the enclosure 208 with the identification pattern 209 within the system. By way of example, the enclosure 208 may shield the PCB assembly 206 from external elements, such as dust and debris, to maintain a structural integrity of the PCB assembly 206 (e.g., of the PCB 202, of the electrical components 213). In addition, packaging 215 (e.g., a cardboard box) may encase the enclosure 208, along with the PCB assembly 206 disposed therein, and may be used to transport the PCB assembly 206 in a secure manner, such as to a customer. The identification pattern 209 may be applied to the packaging 215 and/or the enclosure 208, such as using a similar technique discussed with respect to the identification pattern 204 applied to the PCB assembly 206. Accordingly, the identification pattern 209 may be uniquely applied to the enclosure 208. Thus, the identification pattern 209 may distinguish the enclosure 208 having the particular PCB assembly 206 from other enclosures that may have a different PCB assembly. For this reason, the identification pattern 209 may be used to authenticate the specific PCB assembly 206 that may be disposed within the enclosure 208.

In certain embodiments, the enclosure 208 and/or the packaging 215 may have a formation 207 (e.g., a crack, an opening) that may be used to access an interior of the enclosure 208. For example, a user, such as a customer, may utilize the formation 207 to retrieve the PCB assembly 206 from within the enclosure 208 and/or the packaging 215. The identification pattern 209 may be applied over the formation 207 (e.g., the formation 207 may extend at least partially across the identification pattern 209) to provide further authentication capabilities. For instance, retrieval of the PCB assembly 206 via the formation 207 may cause the formation 207, as well as the identification pattern 209 applied over the formation 207, to become distorted. Thus, distortion of the identification pattern 209 may indicate access of the interior of the PCB assembly 206, such as to retrieve the PCB assembly 206. For this reason, the appearance of the identification pattern 209 may be used to determine whether the interior of the enclosure 208 and/or the packaging 215 has been accessed (e.g., whether there has been tampering of the enclosure 208).

In some embodiments, the identification pattern 209 may be applied to counterfeit-protection or warrantee stickers and/or seals, screw heads, and/or fasteners (e.g., zip ties, tape wrapping, etc.) In this manner, distortion of the identification pattern 209 may similarly indicate whether the interior of the enclosure 208 and/or the packaging 215 has been accessed.

Similarly, the packaging 215 may have a sealant 211 (e.g., tape, glue), which may be applied to the formation 207 in some embodiments to maintain structural integrity of the formation 207, such as to block unintentional access to the interior of the enclosure 208 and maintain positioning of the PCB assembly 206 within the packaging 215. As such, the sealant 211 may also be distorted upon accessing the interior of the enclosure 208 via the formation 207. The identification pattern 209 may also be applied over the sealant 211 to provide improved authentication capabilities. For example, the panel assembly 206 may be disposed within the packaging 215, the packaging 215 may be adjusted to provide the formation 207, the sealant 211 may be applied over the formation 207, and the identification pattern 209 may then be applied over the formation 207 and the sealant 211. In this manner, distortion of the sealant 211 may also cause distortion of the identification pattern 209. Accordingly, distortion of the identification pattern 209 may further indicate attempted access of the interior of the packaging 215 via the formation 207 and the sealant 211 applied to the formation 207. In this manner, the identification pattern 209 may facilitate authentication of the PCB assembly 206 and identification of potential tempering of the packaging 215.

Figure 4:
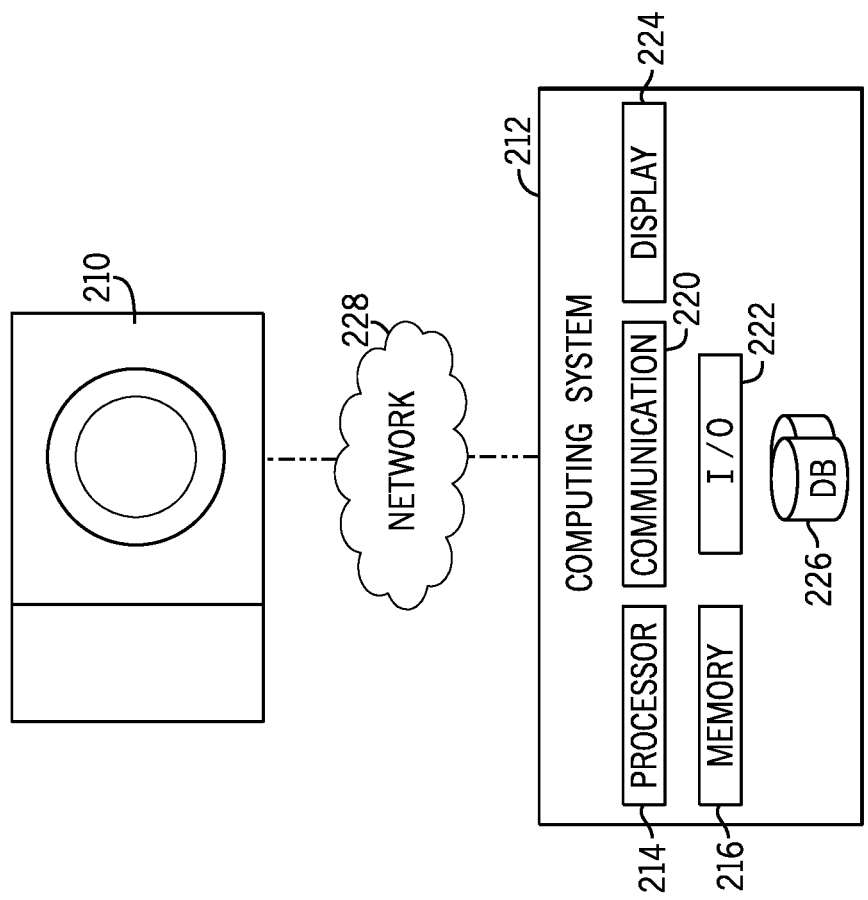
FIG. 4 is a perspective view of a camera that may identify an identification pattern of a PCB and/or of an enclosure, in accordance with an aspect of the present disclosure.

As shown in FIG. 4, the system 200 may also include an optical sensor 210 (e.g., a digital camera, a film camera, or other image capturing device), and a computing system 212 (e.g., an automation controller, a programmable controller, an electronic controller, a cloud computing system, control circuitry). The optical sensor 210 and the computing system 212 may be used to authenticate the PCB assembly 206, such as via the identification pattern 204 and/or the identification pattern 209. The optical sensor 210 may capture the image of the identification pattern 204 applied to the PCB assembly 206 and/or the identification pattern 209 applied to the enclosure 208. The optical sensor 210 may include any suitable device that may capture the image (e.g., a single image, multiple images, a video or animation) of the PCB assembly 206 and/or of the enclosure 208. For example, the optical sensor 210 may be positioned adjacent to (e.g., above) the PCB assembly 206, the enclosure 208, or the packaging 215 at a suitable distance and angle to enable the image to be captured at a desirable resolution (e.g., within a threshold resolution). The optical sensor 210 may capture the image at any suitable time after the identification pattern(s) 204, 209 have been applied. The optical sensor 210 may send the captured image data to the computing system 212.

The computing system 212 may receive and process the image data captured by the optical sensor 210. The computing system 212 may include a processor 214 (e.g., processing circuitry), a memory 216, a communication component 220, input/output (I/O) ports 222, a display 224, a database 226, and the like. The processor 214 may be any type of computer processor or microprocessor capable of executing computer-executable code. The processor 214 may include multiple processors that may perform the operations described herein. The memory 216 may be any suitable articles of manufacture that can serve as media to store processor-executable code, data, or the like. These articles of manufacture may represent computer-readable media (e.g., any form of memory) that may store the processor-executable code used by the processor to perform the presently disclosed techniques. The memory 216 may store data, various other software applications for analyzing the data, and the like. The memory 216 may represent non-transitory computer-readable media (e.g., any suitable form of memory or storage) that may store the processor-executable code used by the processor to perform various techniques described herein. It should be noted that non-transitory indicates that the media is tangible and not merely a signal.

The communication component 220 may be a wired or a wireless communication component that may facilitate communication between the computing system 212, the optical sensor 210, and/or various other computing systems via a network 228. The computing system 212 may be communicatively coupled to the optical sensor 210 and may receive data from the optical sensor 210, and such data may include image data. For example, the optical sensor 210 may capture an image of the PCB assembly 206 and communicate the image data wirelessly to the computing system 212 via the network 228. Additionally or alternatively, the computing system 212 may be communicatively coupled to the optical sensor 210 via a wired connection, and the optical sensor 210 may communicate the image data to the computing system 212 via the wired connection.

The I/O ports 222 may be interfaces that may couple to other peripheral components such as input devices (e.g., keyboard, mouse), sensors, input/output (I/O) modules, and the like. The display 224 may operate to depict visualizations associated with software or executable code being processed by the processor. In an example, the display 224 may be a touch display capable of receiving inputs from a user. The display 224 may be any suitable type of display, such as a liquid crystal display (LCD), plasma display, or an organic light emitting diode (OLED) display, for example.

In some embodiments, the computing system 212 may use the data received from the optical sensor 210 to associate the identification pattern 204 with the PCB assembly 206 and/or to associate the identification pattern 209 with the enclosure 208, such as after manufacture of the PCB assembly 206, after disposal of the PCB assembly 206 in the enclosure 208, and/or before delivery of the PCB assembly 206 and/or of the enclosure 208 to a customer. For example, the image data received from the optical sensor 210 may include an image of the PCB assembly 206 with the applied identification pattern 204 and/or an image of the enclosure 208 with the applied identification pattern 209. The computing system 212 may receive the image data, associate the identification pattern 204 with the PCB assembly 206 and/or the identification pattern 209 with the enclosure 208 based on the received image data, and store the image data and the association(s) in the database 226. Thus, the computing system 212 may communicate with the optical sensor 210 to store unique associations between the identification pattern 204 and the PCB assembly 206 and/or between the identification pattern 209 and the enclosure 208

The computing system 212 may also receive an additional identification pattern (e.g., a serial number, a barcode, a QR code, a stock keeping unit, a universal product code) associated with the PCB assembly 206 in certain embodiments. The computing system 212 may further associate the identification pattern 204 and/or the identification pattern 209 with the additional identification pattern. Such association between the additional identification pattern and the identification pattern(s) 204, 209 may provide further authentication capabilities for the PCB assembly 206. By way of example, the additional identification pattern may also be unique and specifically associated with the particular PCB assembly 206. Thus, the association between the additional identification pattern and the identification pattern(s) 204, 209 may further verify the identity of the particular PCB assembly 206.

In additional or alternative embodiments, the computing system 212 may use the data received from the optical sensor 210 to authenticate the PCB assembly 206. For instance, the computing system 212 may have previously associated the PCB assembly 206 with the identification pattern(s) 204, 209 and/or with the identification pattern 209. After storing such associations, the computing system 212 may receive image data of the PCB assembly 206 via the optical sensor 210. For example, a customer may use the optical sensor 210 to capture an image of the PCB assembly 206. The computing system 212 may receive image data of the captured image, identify the identification pattern(s) 204, 209 indicated by the image data, and determine whether the identification pattern(s) 204, 209 matches any identification pattern of an image stored in the database 226. That is, the computing system 212 may retrieve a stored image from the database 226 to compare the stored image with the identification pattern of the received image data. Upon determining the identification pattern(s) 204, 209 matches an identification pattern of a stored image, the computing system 212 may verify the identity of the PCB assembly 206. In other words, the computing system 212 may determine that the PCB assembly 206 is authentic based on the match between the identification pattern(s) 204, 209 of the captured image and the identification pattern of the stored image. In embodiments in which the identification pattern(s) 204, 209 is associated with an expected additional identification pattern, the computing system 212 may also receive a captured additional identification pattern and determine whether the captured additional identification pattern matches the expected additional identification pattern associated with the identification pattern(s) 204, 209 to verify the identity of the PCB assembly 206.

However, upon determining the identification pattern of the received image data does not match any identification pattern of a stored image, the computing system 212 may not verify the identity of the PCB assembly 206. That is, the computing system 212 may determine the PCB assembly 206 is not authentic (e.g., the PCB assembly 206 may be counterfeit). Additionally or alternatively, the computing system 212 may receive a captured additional identification pattern and determine that the captured additional identification pattern does not match the expected additional identification pattern associated with the PCB assembly 206 (e.g., the expected additional identification pattern associated with the identification pattern(s) 204, 209. In response, the computing system 212 may determine that the PCB assembly 206 is not authentic (e.g., the additional identification pattern may be duplicated and applied to a counterfeit PCB assembly 206), even though the captured identification pattern(s) 204, 209 of the captured image may match the identification pattern of a stored image.

In some embodiments, a non-image representation of the identification pattern 209 may be received by the computing system 212. For example, minutiae or specific points on the identification pattern(s) 204, 209 may be identified and stored as data in the database 226. Similar to the manner described above, the minutiae or the specific points of the identification pattern(s) 204, 209 may enable the computing system 212 to determine if the PCB assembly 206 is not authentic. That is, the computing system 212 may have previously associated the PCB assembly 206 with the minutiae or the specific points of the identification pattern(s) 204, 209. The computing system may receive the non-image representation and determine whether the PCB assembly 206 is authentic based on the match between the stored minutiae or the specific points and the received minutiae or the specific points.

The computing system 212 may then send a notification to the customer indicating the results of the comparison (e.g., the comparison is or is not within a threshold percentage of comparability). For instance, in response to determining the difference in the percentage of comparability is above a threshold, the computing system 212 may determine the PCB assembly 206 is not a match and is, therefore, a counterfeit. As such, the computing system 212 may generate a notification to send to the customer indicating the results of the comparison.

In certain embodiments, the computing system 212 may also generate the identification pattern(s) 204, 209. By way of example, the computing system 212 may use entropy data to generate a pseudo-random shape, a pseudo-random position, or any other pseudo-random appearance. The identification pattern(s) 204, 209 having the appearance generated by the computing system 212 may then be applied to the PCB assembly 206 and/or the enclosure 208, respectively.

Each of FIGS. 3-5 described below illustrates a method associated with a PCB assembly. In some embodiments, operation of any of the methods may be performed by a machine, such as by the computing system 212 (e.g., the processor 214). Indeed, the operation of any of the methods may be performed by a common component or device. It should also be noted that additional operations may be performed with respect to the described methods. Moreover, certain operations of the depicted methods may be removed, modified, and/or performed in a different order. Further still, the operations of any of the respective methods may be performed in parallel with one another, such at the same time and/or in response to one another.

Figure 5:
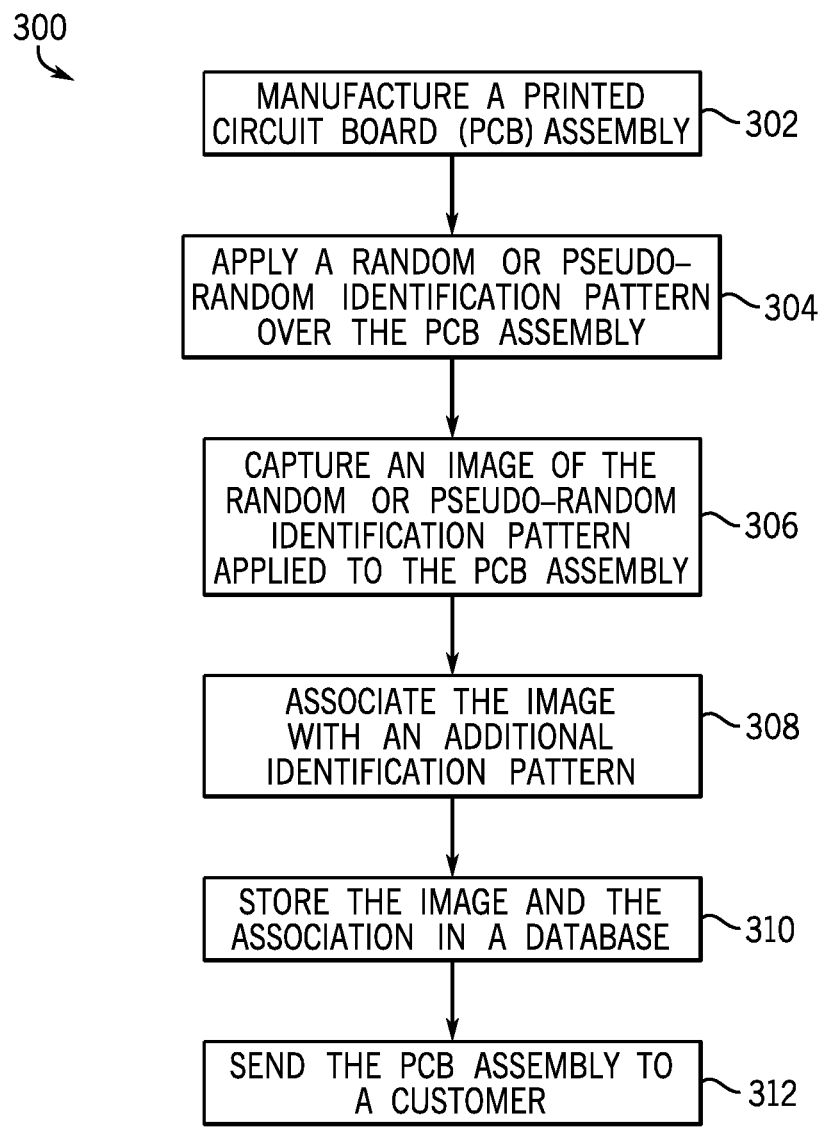
FIG. 5 is flowchart of a method for manufacturing a PCB with an identification pattern, in accordance with an aspect of the present disclosure.

FIG. 5 is a flowchart of a method 300 for manufacturing a PCB assembly with an identification pattern. At block 302, a PCB assembly may be designed and manufactured by coupling one or more electronic components to a PCB. For example, the PCB may be coupled to a battery, an inductor, a resistor, a capacitor, a switch, and the like. Further, an additional identification pattern (e.g., a serial number, a barcode, a QR code, a stock keeping unit, a universal product code) may be generated for the PCB assembly. For example, the additional identification pattern may be printed on a surface of the PCB, such as before a surface finish is applied.

At block 304, a random or pseudo-random identification pattern may be applied to the PCB assembly. For example, the random or pseudo-random identification pattern may be applied to the PCB and/or to the electrical components coupled to the PCB. In some embodiments, the random or pseudo-random identification pattern may be digitally generated. It should be noted that the identification pattern applied to the PCB assembly may scale with the size of the electrical components it is applied to. In this manner, a portion of or all of the desired electrical components may be covered to ensure protection of the PCB assembly.

In additional or alternative embodiments, the random or pseudo-random identification pattern may be randomly applied using another technique. For instance, the random or pseudo-random identification pattern may be applied as a coating of material (e.g., conformal coating), a sprayed material, a film of material, a cover of material, and the like. As an example, a spray device may output fluid onto the PCB assembly to create the random or pseudo-random identification pattern on the PCB assembly. As another example, a brush (e.g., bristles) may be coated with fluid, and the fluid may be transmitted from the brush onto PCB assembly, such as by contacting the brush with the PCB assembly and/or by moving the bristles of the brush to flick the fluid from the bristles onto the PCB assembly.

In some embodiments, a cover (e.g., a dry film, a wet film, a photoresist) may be applied to the PCB. The cover may chemically react (e.g., under certain light) to provide desirable characteristics (e.g., impedance) and/or protection (e.g., chemical protection) of the PCB. The electrical components may be coupled to the PCB after the cover has been applied to the PCB. The random or pseudo-random identification pattern may be applied to the cover. In this manner, the electrical components may be positioned over the random or pseudo-random identification pattern for the PCB assembly.

At process block 306, an image of the random or pseudo-random identification pattern applied to the PCB assembly may be captured. As an example, after the random or pseudo-random identification pattern has been applied to the PCB assembly, an optical sensor may be positioned at a suitable position and/or orientation with respect to the PCB assembly to enable capture of the image of the random or pseudo-random identification pattern applied to the PCB. The image captured by the image capturing device may be of a desirable quality (e.g., within a threshold resolution, of a threshold size) to enable further processing of the image.

At process block 308, the image may be associated with an additional identification pattern of the PCB assembly. The additional identification pattern may enable identification of the specific PCB assembly. In other words, the additional identification pattern may be uniquely associated with the PCB assembly and not other PCB assemblies. For example, various information of the PCB assembly, such as a specification, a list of electrical components, a manufacturer date, and so forth, may be stored in association with the additional identification pattern for retrieval based on the additional identification pattern. The image, which includes the random or pseudo-random identification pattern, may also be associated with the additional identification pattern. Thus, the random or pseudo-random identification pattern may be specifically associated with the PCB assembly having the additional identification pattern.

At process block 310, the image and the association may be stored in a database. In this manner, the image and the association may be retrieved for later reference. As an example, the image and the association may be used to authenticate the PCB assembly (e.g., to verify the identity of the PCB assembly). At process block 312, the PCB assembly with the random or pseudo-random identification pattern may be sent to a customer.

It should be noted that a method similar to the method 300 may be utilized to authenticate the PCB assembly based on an enclosure in which the PCB assembly is disposed. For example, the PCB assembly may be disposed within the enclosure, and an identification pattern may be applied to the enclosure. An image of the enclosure may be captured, and the random or pseudo-random identification pattern of the image may be associated with the PCB assembly disposed in the enclosure. Thus, the PCB assembly may be specifically associated with the random or pseudo-random identification pattern applied to the enclosure.

Figure 6:
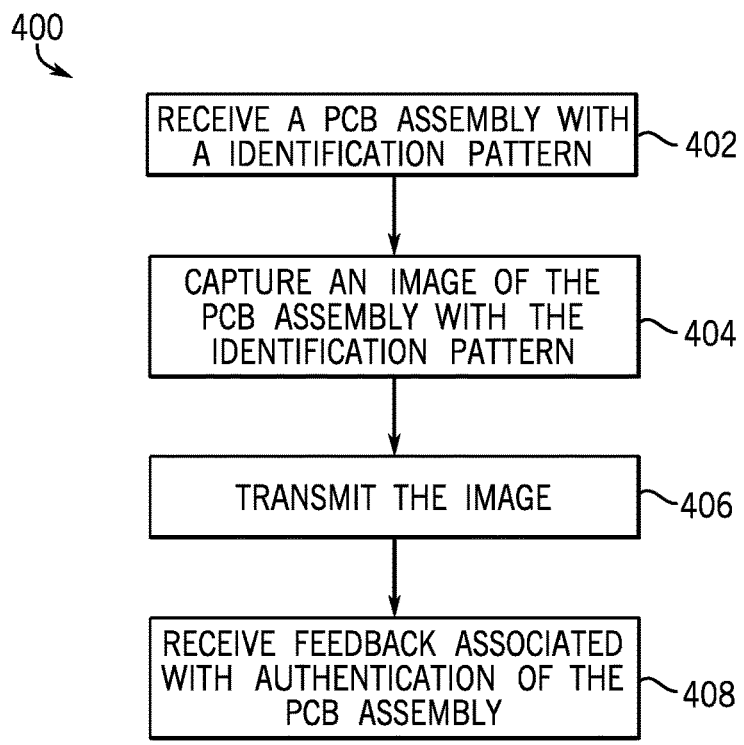
FIG. 6 is a flowchart of a method for sending an identification pattern of a PCB for authentication, in accordance with an aspect of the present disclosure.

FIG. 6 is a flowchart of a method 400 for transmitting an image to authenticate a PCB assembly having an identification pattern applied via the technique discussed herein. At process block 402, the PCB assembly with the identification pattern may be received, such as from a manufacturer (e.g., via the process block 312 of the method 300). As disclosed herein, in some embodiments, the PCB assembly may be disposed within an enclosure, and the enclosure may also include the identification pattern.

At process block 404, an image of the PCB assembly having the identification pattern may be captured, such as using an optical sensor. At process block 406, the image may be transmitted (e.g., to the manufacturer). At process block 408, feedback associated with authentication of the PCB assembly may be received. The feedback may indicate whether the identity of the PCB assembly may be verified, such as based on the percentage of comparability between the captured image (e.g., having captured identification pattern) and an image (e.g., having stored identification pattern) stored in a database. For example, if the percentage of comparability is above a threshold percentage (e.g., 98% to 100%, 90% to 100%, 80% to 100%), then the feedback may indicate the PCB assembly with the identification pattern is authentic and is not a counterfeit. However, if the percentage of comparability is below the threshold percentage, then the feedback may indicate the PCB assembly is not authenticated and is a counterfeit. The feedback may also provide the identified percentage.

Additionally or alternatively, a particular local area (e.g., a portion) on the PCB assembly may be below the threshold percentage, which may indicate that only a particular part of the PCB assembly has been replaced or tampered with. For example, the overall area may be above the threshold percentage, however, the particular local area may be beneath the threshold percentage. Therefore, the particular local area may not be verified due to being below the threshold percentage. As such, the feedback may indicate the particular local area of the PCB assembly has been replaced or tampered with and/or is counterfeit.

In certain embodiments, an additional identification pattern of the PCB assembly may also be transmitted (e.g., to the manufacturer) to facilitate authentication of the PCB assembly. The additional identification pattern may enable a stored image to be retrieved and compared with the captured image. By way of example, the additional identification pattern may have been previously associated with a stored image, which may have an expected stored identification pattern associated with the additional identification pattern. Transmission of the additional identification pattern may enable the corresponding stored image associated with the additional identification pattern to be retrieved for comparison with the captured image (e.g., to determine whether the captured identification pattern associated with the captured image matches the stored identification pattern associated with the stored image). As such, the additional identification pattern may be used to retrieve the stored image with which the captured image may be compared to verify the identity of the PCB assembly.

The method 400 may be performed at any suitable time during the lifespan of the PCB assembly. For example, the method 400 may be performed prior to sending of the PCB assembly to a customer, during installation of the PCB assembly, and/or during maintenance of the PCB assembly to authenticate the PCB assembly. Indeed, the method 400 may be performed by any suitable entity, such as a manufacturer, a customer, a shipment operator, and so forth.

Figure 7:
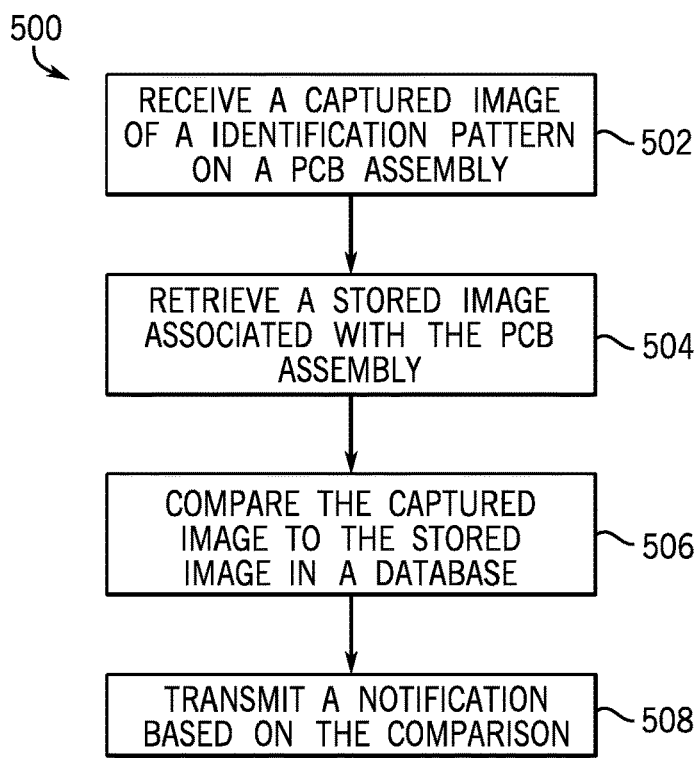
FIG. 7 is a flowchart of a method for authenticating a received identification pattern of a PCB, in accordance with an aspect of the present disclosure.

FIG. 7 is a flowchart of a method 500 for authenticating a PCB assembly via an identification pattern. At process block 502, a captured image of an identification pattern on a PCB assembly may be received, such as via the process block 406 of the method 400. At process block 504, a stored image associated with the PCB assembly may be retrieved. For example, the stored image may have been previously captured and stored in a database (e.g., during a manufacture operation). In some embodiments, an additional identification pattern associated with the PCB assembly may also be received. The stored image may be retrieved based on the additional identification pattern. As an example, the stored image may be indicative of an expected appearance of the identification pattern for the PCB assembly (e.g., a stored identification pattern associated with the additional identification pattern).

At process block 506, the captured image and the stored image in the database may be compared with one another. In some embodiments, image or object recognition may be used to determine a comparability (e.g., similarity) between the captured image and the stored image. In other words, the comparison between the captured image and the stored image may facilitate determination of whether the PCB assembly with the identification pattern in the captured image matches an expected PCB assembly indicated by the stored image (e.g., an expected PCB assembly associated with the additional identification pattern of the PCB assembly in the captured image). The result of the comparison may be output in the form of a percentage of comparability in which a higher percentage indicates a higher comparability between the captured image and the stored image (e.g., between the captured identification pattern and the stored identification pattern).

At process block 508, a notification may be transmitted based on the comparison. In an embodiment, the notification may be output based on a percentage of comparability between the captured image and the stored image with respect to a threshold value. For example, based on the percentage of comparability exceeding the threshold value to indicate a relatively high amount of comparability between the captured image and the stored image, a notification may be transmitted to indicate the PCB assembly is authenticated (e.g., the identity of the PCB assembly is verified, the PCB assembly is not counterfeit). As another example, based on the percentage of comparability being below the threshold value to indicate a relatively low amount of comparability between the captured image and the stored image, a notification may be transmitted to indicate the PCB assembly is not successfully authenticated (e.g., the identity of the PCB assembly is not verified, the PCB assembly may be counterfeit or tampered with). Therefore, the notification may be provided to verify whether the PCB assembly is authentic or counterfeit.

The method 500 may also be performed at any suitable time during the lifespan of the PCB assembly, such as prior to sending of the PCB assembly to a customer, during installation of the PCB assembly, and/or during maintenance of the PCB assembly to authenticate the PCB assembly. The method 500 may also be performed by any suitable entity during such times.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Moreover, when introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A method of manufacture, comprising:
coupling a plurality of electronic components to a printed circuit board (PCB);
applying an identification pattern over the plurality of electronic components coupled to the PCB, wherein applying the identification pattern comprises outputting a coating of material onto the plurality of electrical components;
capturing an image of the identification pattern applied over the plurality of electronic components coupled to the PCB;
associating the image with an additional identification pattern associated with the PCB; and
storing the image and the association between the image and the additional identification pattern in a database.

2. The method of claim 1, wherein applying the identification pattern over the plurality of electronic components of the PCB comprises applying the identification pattern to an additional plurality of electronic components of a plurality of PCBs comprising the PCB.

3. The method of claim 1, wherein the additional identification pattern comprises a serial number, a barcode, a quick response (QR) code, a stock keeping unit, a universal product code, or any combination thereof.

4. The method of claim 1, comprising generating, via a processor, a pseudo-random image, wherein the pseudo-random image is applied as the identification pattern over the PCB.

5. The method of claim 4, comprising disposing the PCB in an enclosure after storing the image and the association between the image and the additional identification pattern in the database.

6. The method of claim 1, comprising:
applying a third identification pattern over an enclosure;
capturing an additional image of the third identification pattern applied to the enclosure;
associating the additional image with the third identification pattern; and
storing the additional image and the association between the additional image and the third identification pattern in the database or another database.

7. The method of claim 6, comprising associating the third identification pattern of the PCB with information different from the additional identification pattern.

8. The method of claim 7, wherein the information comprises a specification, a list of electrical components, a manufacturer date, or any combination thereof.

9. The method of claim 1, comprising identifying one or more points of the identification pattern.

10. The method of claim 9, comprising storing the one or more points of the identification pattern in the database.

11. The method of claim 1, comprising generating the identification pattern based on entropy data.

12. A printed circuit board (PCB) assembly, comprising:
a PCB;
plurality of electronic components coupled to the PCB; and
a cover applied to the PCB and the plurality of electronic components, wherein the cover comprises a coating of material, a sprayed material, a film, or any combination thereof and the cover comprises an identification pattern that covers the plurality of electronic components.

13. The PCB assembly of claim 12, wherein the plurality of electronic components comprise a resistor, a capacitor, a transformer, a transistor, a diode, a battery, an integrated circuit (IC), an oscillator, an inductor, a switch, a sensor, or a conductor, or any combination thereof.

14. The PCB assembly of claim 12, comprising an additional identification pattern applied to the PCB, wherein the additional identification pattern comprises a serial number, a barcode, a quick response (QR) code, a stock keeping unit, a universal product code, or any combination thereof.

15. The PCB assembly of claim 12, wherein the identification pattern is non-visible.

16. A non-transitory computer-readable medium comprising instructions that, when executed by processing circuitry, are configured to cause the processing circuitry to:
receive a captured image of an identification pattern applied via a coating of material that covers a plurality of electronic components coupled to a printed circuit board (PCB), wherein the identification pattern covers the plurality of electronic components;
receive an additional identification pattern associated with the PCB;
retrieve a stored image of the identification pattern associated with the printed circuit board from a database based on the stored image being associated with the additional identification pattern;

compare the captured image and the stored image to one another; and output a notification based on comparison between the captured image and the stored image.

17. The non-transitory computer-readable medium of claim 16, comprising instructions that, when executed by the processing circuitry, are configured to cause the processing circuitry to:

compare the captured image and the stored image to one another by determining a percentage of comparability between features of the PCB shown in the captured image and features of the PCB shown in the stored image.

18. The non-transitory computer-readable medium of claim 17, comprising instructions that, when executed by the processing circuitry, are configured to cause the processing circuitry to:

output the notification based on the percentage of comparability being above or below a threshold value.

19. A method of manufacture, comprising:

applying a first identification pattern over a plurality of electronic components coupled to a printed circuit board (PCB) and a second identification pattern over packaging of the PCB;

capturing an image of the first identification pattern applied to the plurality of electronic components and the second identification pattern applied to the packaging of the PCB;

associating the first identification pattern with the PCB and the second identification pattern with the packaging of the PCB; and storing a first description of the first identification pattern and the association between the first identification pattern and the PCB and a second description of the second identification pattern and the association between the second identification pattern and the packaging of the PCB.

* * * * *